United States Patent [19]

Bellavia, Jr.

[11] Patent Number: 4,790,011

[45] Date of Patent: Dec. 6, 1988

[54] AUTO CLAMP FOR MODULATOR FOR SUPPRESSED SYNC SIGNALS

[75] Inventor: Andrew S. Bellavia, Jr., Elk Grove Village, Ill.

[73] Assignee: Zenith Electronics Corporation, Glenview, Ill.

[21] Appl. No.: 920,804

[22] Filed: Oct. 17, 1986

[51] Int. Cl.$^4$ .................... H04N 7/167; H04N 5/18; H04N 5/53

[52] U.S. Cl. ............................. 380/15; 358/172; 358/178

[58] Field of Search .......... 358/171, 172, 174, 176, 358/178; 380/15

[56] References Cited

U.S. PATENT DOCUMENTS

| | | | |
|---|---|---|---|
| 4,398,215 | 8/1983 | Osaka | 380/15 |
| 4,513,321 | 4/1985 | Olson et al. | 358/172 |
| 4,527,195 | 7/1985 | Cheung | 380/15 |
| 4,562,465 | 12/1985 | Glaab | 380/20 X |
| 4,575,755 | 3/1986 | Schoeneberger et al. | 380/15 |
| 4,695,886 | 9/1987 | Schofield | 358/178 X |
| 4,695,901 | 9/1987 | Ryan | 380/5 |

Primary Examiner—Stephen C. Buczinski
Assistant Examiner—Linda J. Wallace

[57] ABSTRACT

Suppressed sync pulses in a scrambled video signal are restored to their proper level in another video signal that is applied to a clamp circuit for controlling the DC level of an amplifier coupled between the head end encoder and the modulator in a CATV system. This prevents the clamp from drifting and changing the DC signal level in the scrambled video signal supplied to the modulator. The encoder supplies a suppression signal that indicates when a sync pulse is suppressed. This signal is used to trigger sample-and-hold circuits to measure the level of the first suppressed sync pulse after a vertical interval and the level of a sync pulse during the vertical interval when sync pulses are not suppressed. The levels are compared and their difference is used to restore the suppressed sync signals in the video signal applied to the clamp.

4 Claims, 2 Drawing Sheets

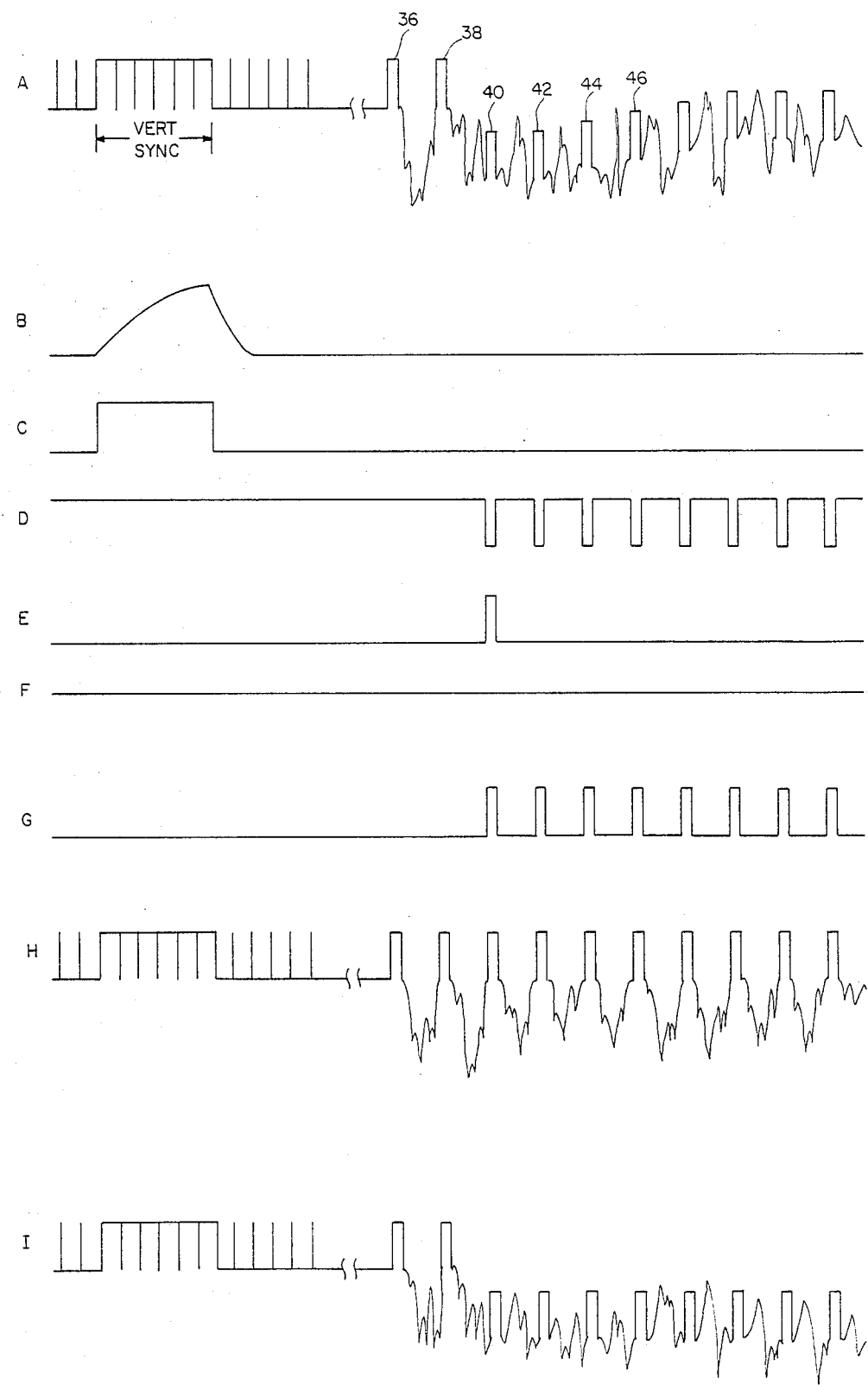

AUTO CLAMP FOR MODULATOR FOR SUPPRESSED SYNC SIGNALS

BACKGROUND OF THE INVENTION AND PRIOR ART

This invention relates generally to modulators for television signal scrambling systems and specifically to modulators for scrambling systems that utilize suppressed synchronizing signals.

It is well known for cable operators to scramble television (TV) signals to prevent unauthorized utilization of these signals. In a common form of scrambling, the horizontal synchronizing pulses (sync pulses) in the TV signal are suppressed except during the vertical interval. When the scrambled baseband video signal is modulated onto the channel frequency carrier, difficulty is encountered. The modulator is designed to clamp to the sync tip level to maintain the correct video level in the signal. The horizontal sync pulses during the vertical interval are at the proper level and enable the modulator to clamp properly. The clamp begins to drift, however, in the presence of the suppressed sync tips and may clamp onto the video signal. The net result is that, unless corrected, the scrambled video signal supplied to the modulator will be distorted and result in a distorted video signal being transmitted. While circuits in the prior art have been developed for correcting this deficiency, they are expensive and cumbersome.

In the present invention, an automatic clamp circuit arrangement splits the scrambled video signal that is being supplied to the modulator into two video signals. In one video signal, the horizontal sync tips are restored to their proper level and that signal is supplied to the clamp for controlling the video level of the input amplifier. Thus, the output of the amplifier is clamped at the proper sync tip level despite the fact that the sync tips in the scrambled video signal are suppressed.

OBJECTS OF THE INVENTION

A principal object of the invention is to provide a novel clamp circuit for a modulator supplied with a video signal with suppressed sync signals.

Another object of the invention is to provide a stable, low cost clamp circuit for automatically retaining the DC level of a video signal at sync tip level despite the presence of suppressed sync tips in the video signal.

BRIEF DESCRIPTION OF THE DRAWING

These and other objects of the invention will be apparent upon reading the following description in conjunction with the drawings in which:

FIG. 2 represents a series of waveforms useful in describing the operation of the clamp circuit of FIG. 1.

DESCRIPTION OF THE PREFERRED EMBODIMENT

Figure 1:
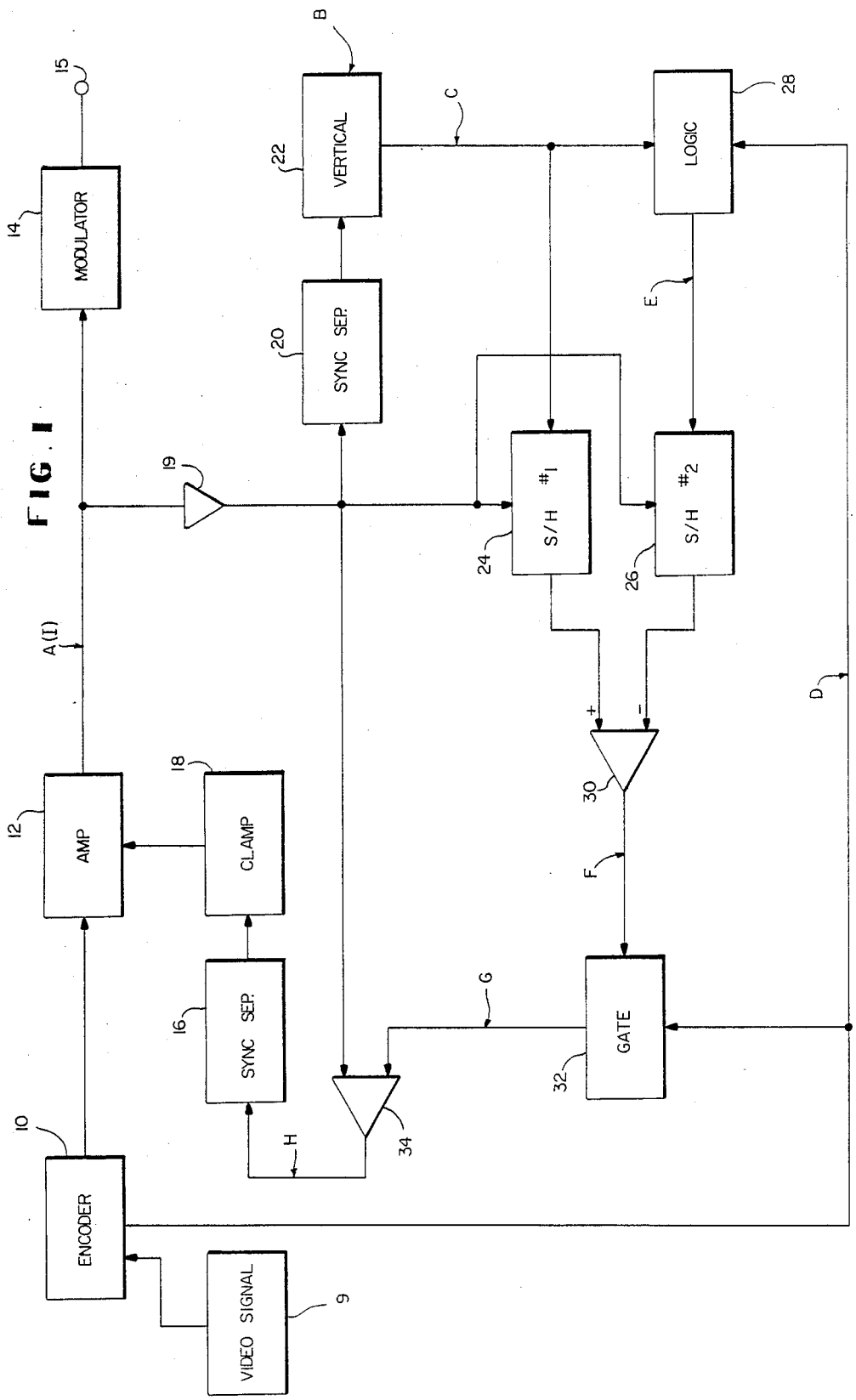
FIG. 1 is a simplified block diagram of the clamp circuit of the invention.

Referring to FIG. 1, a source of video signal 9 is coupled to a CATV encoder 10 which provides a scrambled baseband video signal with suppressed sync tips (except during the vertical interval) to an input amplifier 12 that supplies a modulator 14. Amplifier 12, in turn, is coupled to an output terminal 15 at which is developed a scrambled television signal for transmission. While the video signal has suppressed sync, other forms of encryption, such as video inversion, may also be used in addition to sync suppression. Further, the sync suppression may occur in a random manner. Reference to FIG. 2 in conjunction with FIG. 1 will be helpful and the various waveforms A-I depicted in FIG. 2 are indicated at various points around the block diagram of FIG. 1. Waveform A illustrates a portion of a baseband video signal showing the vertical interval and an expanded series of horizontal sync pulses (with video portions being compressed in time). The first two sync pulses 36 and 38 are at normal level whereas sync pulse 40 is suppressed. Sync pulses 42, 44, and 46 are shown as slowly drifting upward in level because the conventional modulator clamp is trying to clamp to the video signal which has portions of greater amplitude than the sync pulses.

The signal represented by waveform A is that which can occur without level correction. The clamp operation must be stabilized and control the DC level of amplifier 12 to assure a correct amplifier output. The signal of waveform A is applied through a buffer amplifier 19 to a sync separator circuit 20 which feeds a vertical integrator circuit 22 where, in a well-known manner, the vertical sync pulses, indicated by waveform B, are developed. Each vertical pulse is used to develop a trigger pulse as indicated by waveform C. The trigger pulse is supplied to a first sample-and-hold (S/H) circuit 24 and to a logic circuit 28. S/H circuit 24, and a second sample-and-hold circuit S/H 26, are supplied with the video signal (waveform A) through amplifier 19. This video signal is also supplied to an adder 34.

Encoder 10, which is in all respects of conventional design, also develops a signal to indicate when a sync pulse is suppressed. This suppression signal is only present in the cable head end and is not transmitted out on the cable system, and consequently, security of the scrambling is not compromised by its presence. The suppression signal is necessary to control proper operation of the modulators at the head end.

The suppression signal, illustrated by waveform D, is supplied to logic circuit 28 and to a gate 32. Logic 28 supplies a gating signal (waveform E) to S/H circuit 26 and the outputs of both the S/H circuits 24 and 26 are applied to a subtraction circuit 30 for developing a difference voltage that is representative of the amount or amplitude of the sync pulse suppression. The output of subtraction circuit 30 is waveform F, which is supplied to gate 32 where, under control of waveform D, an appropriate voltage is added to video waveform A to develop another video signal with all suppressed sync pulses restored to their proper levels. Thus, the output of adder 34 is waveform H showing a video signal with the suppressed sync pulses restored. This additional video signal is supplied to another sync separator circuit 16 where the sync pulse level is used to control a clamp 18 for setting the DC level of amplifier 12. The net result is that the output of input amplifier 12, when the circuit of the inventio is operating, consists of waveform I wherein the sync pulses are suppressed, yet maintained at a constant level.

The inventive circuit takes advantage of the fact that the sync pulses in the vertical interval are not suppressed and that clampa 18 does not react instantaneously to changes in sync pulse level. The normal sync pulse level (in the vertical interval) is determined by S/H circuit #1. The level of the first suppressed sync pulse after a vertical interval is sample by sample-and-hold circuit #2 and establishes the amount by which the suppressed sync pulse level differs from the normal sync pulse level. Normally, the sync pulse level is about 2.5 volts DC. Since S/H circuit #1 measures the normal sync level and S/H circuit #2 measures the level of the first suppressed sync pulse, subtraction of these signals in subtraction circuit 30 develops a difference signal which is representative of the amount of suppresion of the sync pulses. The difference indicates the amount of additional signal that needs to be added to a suppressed sync pulse to restore it to its normal level. This is accomplished in gate circuit 32 under control of waveform D which denotes suppressed sync pulses. Waveform H is supplied to sync separator 16 for establishing the operation of clamp 18 which maintains amplifier 12 at its correct DC level to produce waveform I for the modulator.

What has been described is a novel clamp circuit for a CATV suppressed sync modulator arrangement which is simple, low cost and effective. It is recognized that numerous modifications and changes in the described embodiment of the invention will be apparent to those skilled in the art without departing from its true spirit. The invention is to be limited only as defined in the claims.

What is claimed is:

1. In combination:
    a source of first video signal including a vertical interval portion having normal sync pulses and other portions having suppressed sync pulses;
    an amplifier having an input for receiving said first video signal and an output for supplying an output signal to a modulator;
    clamp means for maintaining the correct DC level in said output signal of said amplifier;
    correction means for developing a second video signal with restored sync pulses for application to said clamp means for automatically compensating operation of said clamp means for suppressed ones of said sync pulses, said correction means including;
    means for sampling the level of said sync pulses during said vertical interval;
    means for sampling the level of the first suppressed sync pulse occurring after said vertical interval;
    means for comparing said levels to develop a signal representative of the amount of said suppression; and
    means for restoring said sync pulse level in said second video signal.

2. The system of claim 1 wherein said source also supplies a suppression signal that indicates when a sync pulse has been suppressed and further including means for using said suppression signal to control one of said sampling means.

3. The system of claim 2 further including gate means supplied with said suppression signal and said representative signal for restoring the level of said sync pulses in said second video signal.

4. In combination:
    a source of first video signal including a vertical interval portion having normal sync pulses and a suppression signal that indicates when a sync pulse has been suppressed;
    a modulator;
    an amplifier receiving said first video signal and supplying an output signal to said modulator;
    clamp means for establishing the DC level in said output signal from said amplifier;
    means for sampling the level of said sync pulses during said vertical interval;
    means for sampling the level of the first suppressed sync pulse occurring after said vertical interval;
    means for comparing said levels to develop a signal representative of the amount of said suppression;
    gate means supplied with said suppression signal and said representative signal for restoring the level of said suppressed sync pulses in a separately developed second video signal; and
    means for applying said second video signal to said clamp means for controlling the level of said output from said amplifier in accordance with normal and restored sync pulses.

* * * * *